(12) United States Patent
Hermann et al.

(10) Patent No.: US 7,872,762 B2
(45) Date of Patent: Jan. 18, 2011

(54) OPTICAL POSITION MEASURING ARRANGEMENT

(75) Inventors: Michael Hermann, Tacherting (DE); Karsten Sändig, Palling (DE)

(73) Assignee: Dr. Johannes Heidenhain GmbH, Traunreut (DE)

(*) Notice: Subject to any disclaimer, the term of this patent is extended or adjusted under 35 U.S.C. 154(b) by 182 days.

(21) Appl. No.: 12/321,642

(22) Filed: Jan. 23, 2009

(65) Prior Publication Data
US 2009/0195792 A1    Aug. 6, 2009

(30) Foreign Application Priority Data
Feb. 2, 2008    (DE) .................. 10 2008 007 319

(51) Int. Cl.
*G01B 11/02* (2006.01)
*G01B 9/02* (2006.01)
*G01D 5/36* (2006.01)

(52) U.S. Cl. ............... 356/499; 356/521; 250/237 G (58) Field of Classification Search ............ 356/488, 356/494, 499, 521; 250/237 G
See application file for complete search history.

(56) References Cited

U.S. PATENT DOCUMENTS

| | | | | |
|---|---|---|---|---|
| 5,497,226 A | * | 3/1996 | Sullivan | 356/4.01 |
| 5,689,336 A | * | 11/1997 | Huber | 356/499 |
| 5,808,742 A | * | 9/1998 | Everett et al. | 356/509 |
| 5,977,539 A | * | 11/1999 | Holzapfel et al. | 250/237 G |
| 5,994,692 A | * | 11/1999 | Holzapfel | 250/237 G |
| 6,124,589 A | * | 9/2000 | West | 250/231.14 |
| 6,452,159 B2 | * | 9/2002 | Holzapfel et al. | 250/231.13 |
| 7,088,458 B1 | * | 8/2006 | Wegmann | 356/515 |
| 7,223,963 B2 | * | 5/2007 | Okada et al. | 250/231.13 |
| 7,471,397 B2 | * | 12/2008 | Holzapfel | 356/494 |
| 7,573,581 B2 | * | 8/2009 | Holzapfel | 356/499 |
| 7,710,578 B2 | * | 5/2010 | Sandig et al. | 356/499 |
| 2004/0165194 A1 | * | 8/2004 | Hansen | 356/521 |
| 2004/0263860 A1 | * | 12/2004 | Johnson | 356/499 |

(Continued)

FOREIGN PATENT DOCUMENTS

DE    10 2005 029 917 A1    1/2007

(Continued)

*Primary Examiner*—Patrick J Connolly
(74) *Attorney, Agent, or Firm*—Brinks Hofer Gilson & Lione (57) ABSTRACT

An arrangement for generating phase-shifted incremental signals characterizing relative positions of two objects moving with respect to each other along a measuring direction. The measuring arrangement includes a light source emitting bundles of beams, a measurement grating, a plurality of optional gratings and a scanning unit. The scanning unit includes a grating in a scanning plane, wherein the grating includes a plurality of blocks arranged periodically along the measuring direction with a grating periodicity equaling a fringe pattern periodicity, and each block includes n grating sections arranged along the measuring direction, each of the n grating sections having a periodic grating structure, deflecting the bundles of beams propagated through each of the n grating sections in several different spatial directions. The scanning unit further includes a plurality of detector elements arranged downstream of the grating, wherein the detector elements are arranged in the spatial directions in the detector plane, and wherein the detector plane is located where the bundles of beams coming from the grating are spatially separated. The fringe pattern is formed in the scanning plane by the bundles of beams emitted by the light source interacting with the measurement grating and the optional gratings.

18 Claims, 6 Drawing Sheets

U.S. PATENT DOCUMENTS

| | | | |
|---|---|---|---|
| 2007/0013920 A1* | 1/2007 | Holzapfel | 356/616 |
| 2007/0058173 A1* | 3/2007 | Holzapfel | 356/499 |
| 2007/0223007 A1* | 9/2007 | Klaver et al. | 356/499 |
| 2008/0062432 A1* | 3/2008 | Sandig et al. | 356/499 |
| 2008/0304079 A1* | 12/2008 | Schluchter et al. | 356/499 |

FOREIGN PATENT DOCUMENTS

| | | |
|---|---|---|
| EP | 0 724 713 B1 | 5/2000 |

* cited by examiner

OPTICAL POSITION MEASURING ARRANGEMENT

RELATED APPLICATIONS

Applicants claim, under 35 U.S.C. §119, the benefit of priority of the filing date of Feb. 2, 2008 of a German patent application, copy attached, Serial Number 10 2008 007 319.9, filed on the aforementioned date, the entire contents of which is incorporated herein by reference.

BACKGROUND

1. Technical Field

The present invention relates to an optical position measuring arrangement for generating n>1 phase-shifted, shift-dependent incremental signals in relation to two objects which are movable with respect to each other along a measuring direction (x), and includes a measurement grating and a scanning unit having a scanning grating arranged in the scanning plane, as well as several detector units arranged downstream of the scanning grating, from which a fringe pattern of the fringe pattern periodicity $TP_S$ results in the scanning plane because of the interaction of the bundles of beams emitted by a light source with the measurement grating and further optional gratings in the path of the scanning beams.

2. Background Information

Periodic fringe patterns are created in known optical position measuring arrangements by the interaction of a bundle of beams, emitted by a light source, with a measurement grating and possibly further gratings in the path of the scanning beam. In case of the relative movement of defined components of the position measuring arrangement, customarily the measurement grating and a scanning unit, a modulation of the intensity of the fringe pattern results, which can be evaluated for generating shift-dependent incremental signals. Such an evaluation can take place, for example, via so-called structured photo detectors, which include a periodic arrangement of photo diodes. The periodicity of the detector arrangement is matched to the periodicity of the fringe pattern as a function of the number of phase-shifted incremental signals. In the case of higher resolving optical position measuring arrangements, increasingly finer fringe patterns result, i.e. their periodicity is correspondingly reduced; then the required width of the photo diodes is also reduced in a structured photo detector used for scanning such fringe patterns. Because of restrictions as a result of their manufacture, the width of the photo diodes in such an arrangement cannot fall below a defined minimal width. No more suitable structured photo diodes are available below a fringe pattern period of approximately 40 μm.

Therefore solutions have become known where a scanning grating, which includes several different grating sections, is arranged in the scanning plane in which the periodic scanning fringe pattern results. Every grating section has a defined spatial deflection effect on the bundle of beams being propagated through this grating section. The deflection effects of different grating sections differ here. Detector elements, by which the shift-dependent incremental signals can be detected, are then assigned to the different grating sections in the respective spatial deflection direction in the detection plane. In connection with such solutions, reference is made to, for example, EP 724 713 B1. The known variation in EP 724 713 B1 is disadvantageous because of an increased susceptibility of the measurement grating to dirt, in particular linearly-shaped dirt deposits extending along the measuring direction, as well as to inhomogeneities in the measurement grating, for example scratches.

OBJECTS AND SUMMARY OF THE INVENTION

It is an object of the present invention to disclose an optical position measuring arrangement which makes possible the dependable detection of fine fringe patterns in a scanning plane with a high degree of effectiveness and as great as possible an insensitivity to dirt on the measurement grating.

This object is attained by an optical position measuring arrangement for the generation of n>1 phase-shifted incremental signals characterizing relative positions of two objects which are movable with respect to each other along a measuring direction. The optical position measuring arrangement includes a light source that emits bundles of beams, a measurement grating, a plurality of optional gratings and a scanning unit. The scanning unit includes a scanning grating arranged in a scanning plane, wherein the scanning grating includes a plurality of blocks arranged periodically along the measuring direction with a scanning grating periodicity $TP_{AG}$ equaling a fringe pattern periodicity $TP_S$, and each block includes n grating sections (n=1, 2, 3, . . . ) of a width $b_x = TP_{AG}/n$, exclusively arranged along the measuring direction, and each of the n grating sections has a periodic grating structure, which causes a deflection of the bundles of beams propagated through each of the n grating sections in several spatial directions, in which resulting spatial directions of the n grating sections in a block differ. The scanning unit further includes a plurality of detector elements arranged downstream of the scanning grating, wherein the detector elements are arranged in the spatial directions in the detector plane, and wherein the detector plane is located in an area in which the bundles of beams coming from the scanning grating are completely spatially separated. The fringe pattern having a periodicity $TP_S$ is formed in the scanning plane by an interaction of the bundles of beams emitted by the light source with the measurement grating and the further optional gratings.

For one, a special design of the scanning grating in the scanning beam path of the position measuring arrangement is provided in accordance with the present invention. Thus, for generating incremental signals, the scanning grating includes several blocks, which are periodically arranged along the measuring direction with the scanning grating periodicity $TP_{AG} = TP_S$. Each block contains n grating sections of a width $b_x = TP_{AG}/n$ exclusively arranged along the measuring direction. Each grating section has a periodic grating structure, which causes a deflection in several spatial directions of the bundles of beams being propagated through this grating section. The resulting spatial directions of the grating sections in a block differ.

It is moreover provided to arrange detector elements in a detector plane in these different spatial directions. The detector plane is located in an area in which the bundles of beams coming from the scanning grating are spatially separated.

In this connection it has been shown to be particularly advantageous that, because of the arrangement of the grating sections exclusively along the measuring direction, a reduced susceptibility results in comparison with the known prior art system. Furthermore, the generated incremental signals have a higher degree of modulation because of the provided width of the grating section. It should moreover be stated that, because of the employment of bundles of beams respectively deflected in several spatial directions, a high degree of efficiency is assured.

Based on the measures in accordance with the present invention, it is now possible to dependably scan very fine fringe patterns with a high degree of effectiveness in a scanning plane of optical position measuring arrangements.

In a possible embodiment, the optical position measuring arrangement in accordance with the present invention for generating n>1 phase-shifted, shift-dependent incremental signals in relation to two objects which are movable with respect to each other along a measuring direction, includes a measurement grating and a scanning unit with a scanning grating arranged in the scanning plane, as well as several detector units arranged downstream of the scanning grating, from which a fringe pattern of the fringe pattern periodicity $TP_S$ results in the scanning plane because of the interaction of the bundles of beams emitted by a light source with the measurement grating and further optional gratings in the path of the scanning beams. For generating the incremental signals, the scanning grating includes several blocks, periodically arranged along the measuring direction at the scanning grating periodicity $TP_{AG}=TP_S$, where each block has n grating sections of a width $b_x=TP_{AG}/n$, which are exclusively arranged along the measuring direction, and each grating section has a periodic grating structure which causes a deflection of the bundle of beams being propagated through this grating section in several spatial directions, wherein the resulting spatial directions of the grating sections in a block differ. Detector elements are arranged in the different spatial directions in a detection plane, and the detection plane is located in an area in which the bundles of beams coming from the scanning grating are completely spatially separated.

The grating structures preferably include structural elements which are periodically arranged at the grating section periodicity $TP_G$ and have alternatingly different optical properties, which are respectively arranged within a grating section at the same twist angle in relation to an axis perpendicularly to the measuring direction.

In this case, two or four different twist angles can be selected for n=4 different grating sections in one block for the structural elements of the grating sections.

It is therefore possible that in case of two provided different twist angles, these are selected in accordance with $\alpha_1=0°$, $\alpha_2=0°$, $\alpha_3=90°$, $\alpha_4=90°$, or in case of four provided different twist angles, these are selected in accordance with $\alpha_1=0°$, $\alpha_2=30°$, $\alpha_3=90°$, $\alpha_4=-30°$.

It is alternatively possible to select two different twist angles for n=3 different grating sections in a block for the structural elements of the grating sections.

It is therefore then possible that in case of two provided different twist angles, these are selected in accordance with $\alpha_1=90°$, $\alpha_2=90°$, $\alpha_3=0°$, or in case of three provided different twist angles, these are selected in accordance with $\alpha_1=90°$, $\alpha_2=20°$, $\alpha_3=-20°$.

The grating structures can be designed as phase gratings, in which different structural elements provide respectively different shifting effects for the incoming bundles of beams.

Alternatively, the grating structures can be designed as amplitude gratings, in which different structural elements respectively have a different permeability for the incoming bundles of beams.

It is possible to select n=4 or n=3.

The detector elements are preferably embodied to be rectangular and are of a greater length along the measuring direction than along the direction perpendicular to it.

The different grating sections can have the same grating section periodicity.

In this connection it is possible that the centers of area of the detector elements are arranged on a circle with the radius R.

However, it is also possible for two different grating sections to have two different grating section periodicities.

In this case the centers of area of the detector elements can be arranged in the detection plane on two circles of different radii.

In a possible embodiment of the optical position measuring arrangement, the scanning unit is designed in such a way that the bundles of beams emitted by a light source impinge a first time on the measurement grating, where a split into two partial beam bundles takes place, which are reflected back to the scanning unit and correspond to two different orders of diffraction, the two retro-reflected partial beam bundles undergo a retro-reflection in the direction toward the measurement grating in the scanning unit a retro-reflector element, in the course of which the partial beam bundles each pass twice through the grating, the partial beam bundles which impinge for the second time on the measurement grating undergo another diffraction and retro-reflection in the direction of the scanning unit, at least one pair of retro-reflected partial beam bundles impinges at the same location on the scanning grating under symmetrical angles with respect to the optical axis.

An optical focusing device can be arranged between the scanning grating and the downstream-arranged detector elements, by which the focusing of the partial beam bundles deflected in different spatial directions on the detector elements takes place.

Further advantages, as well as details, of the position measuring arrangement in accordance with the present invention ensue from the following description of an exemplary embodiment by the attached drawing figures.

BRIEF DESCRIPTION OF THE DRAWINGS

FIG. 2a is a partial plan view of a second embodiment of a suitable scanning grating to be used with the position measuring arrangement of FIG. 1a;

FIG. 2b is a plan view of the detector plane in the case of the employment of the scanning grating in accordance with FIG. 2a;

FIG. 3a is a partial plan view of a third embodiment of a suitable scanning grating to be used with the position measuring arrangement of FIG. 1a;

FIG. 3b is a plan view of the detector plane in the case of employing the scanning grating in accordance with FIG. 3a;

FIG. 4a is a partial plan view of a fourth embodiment of a suitable scanning grating to be used with the position measuring arrangement of FIG. 1a; and FIG. 4b is a plan view of the detector plane in the case of employing the scanning grating in accordance with FIG. 4a.

DETAILED DESCRIPTION OF THE PREFERRED EMBODIMENTS

Figure 1A:
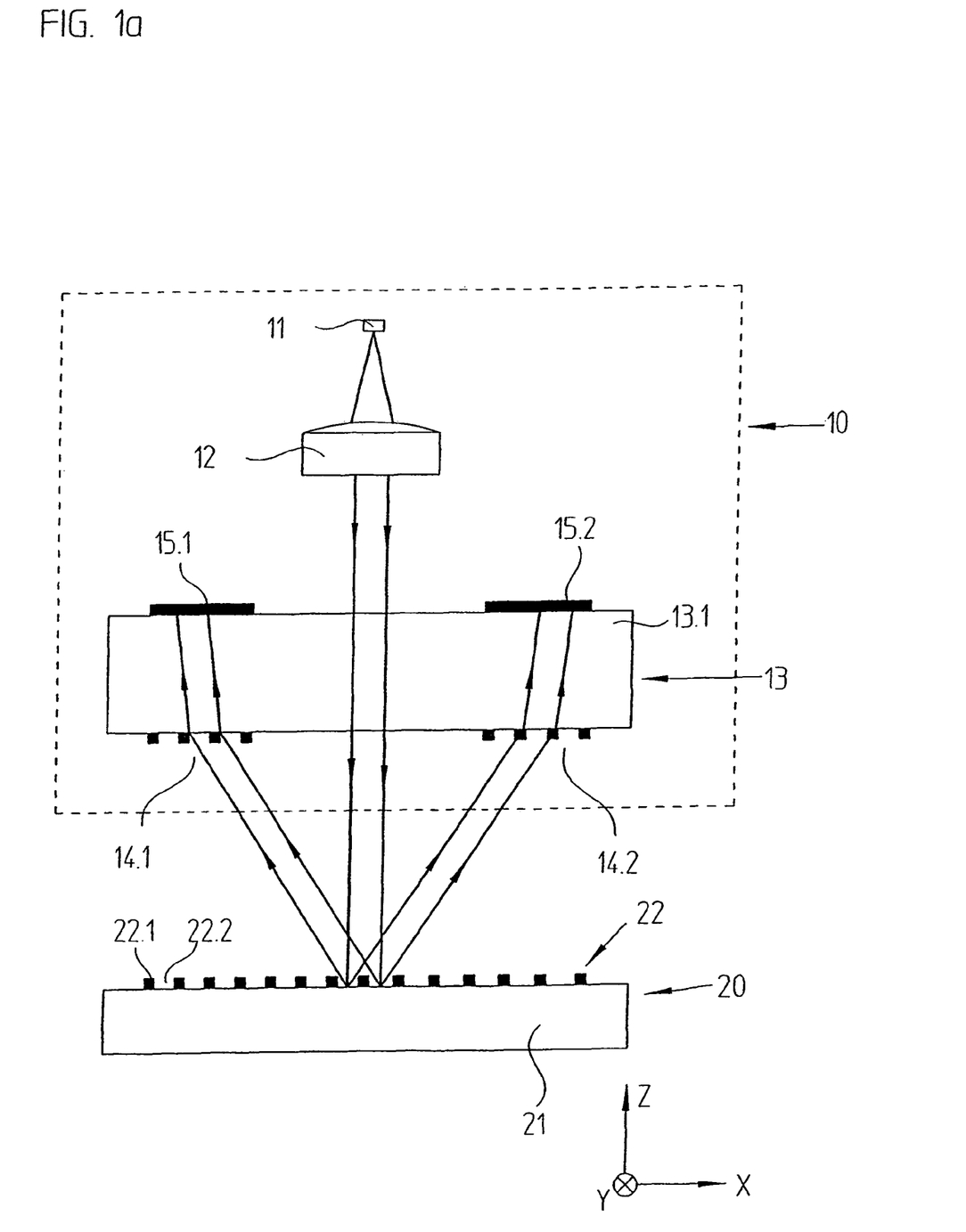
FIG. 1a shows a first portion of the scanning beam path of a first exemplary embodiment of a position measuring arrangement in accordance with the present invention.
Figure 1B:
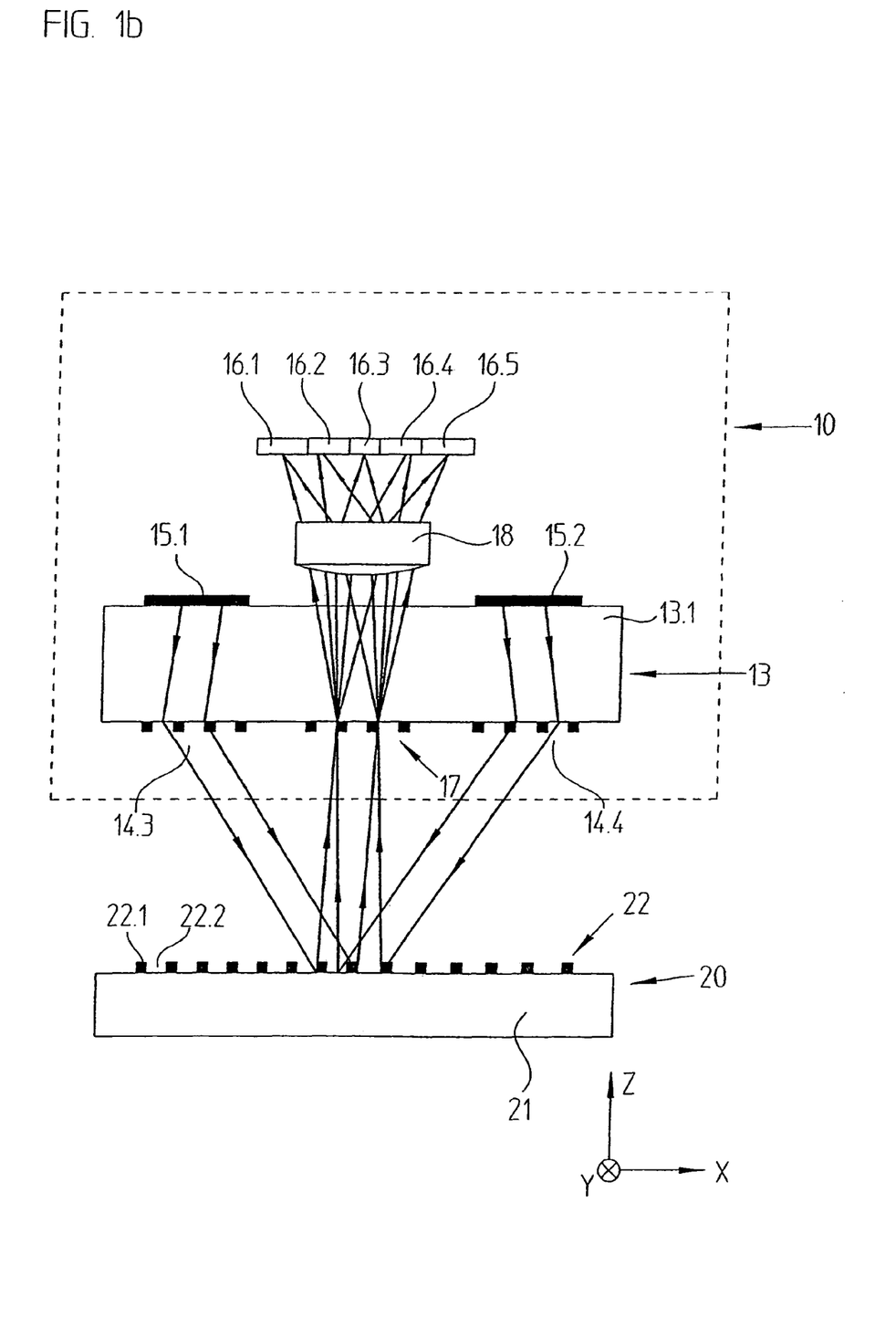
FIG. 1b shows a second portion of the scanning beam path of the first exemplary embodiment of the position measuring arrangement of FIG. 1a in accordance with the present invention.
Figure 1C:
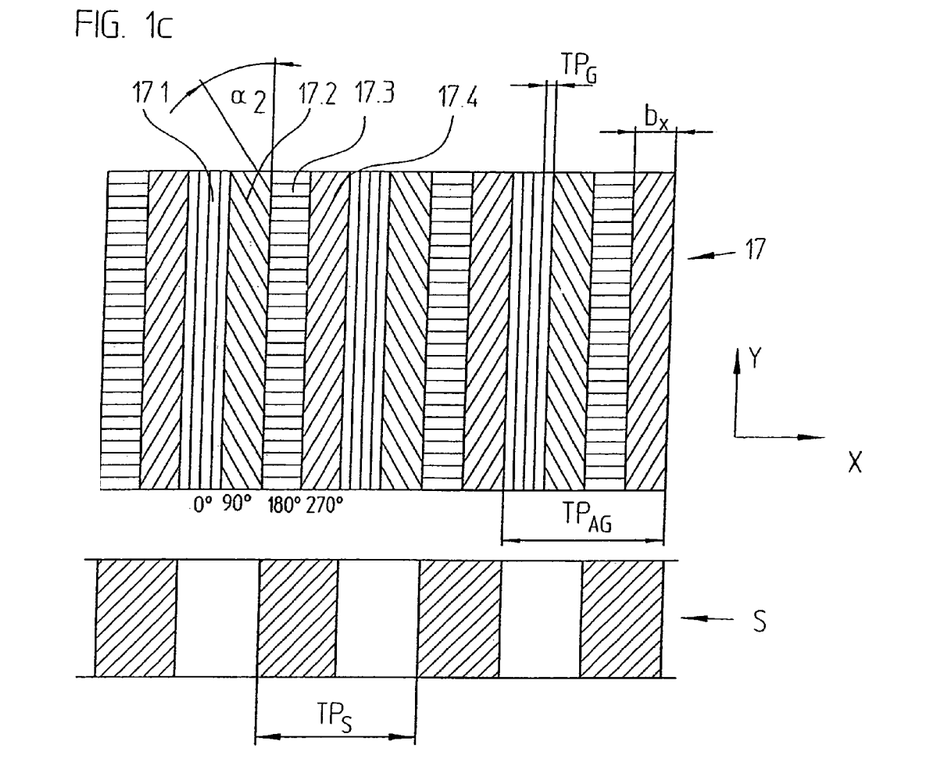
FIG. 1c is a partial plan view of an embodiment of a scanning grating of the position measuring arrangement in accordance with FIGS. 1a and 1b in accordance with the present invention.
Figure 1D:
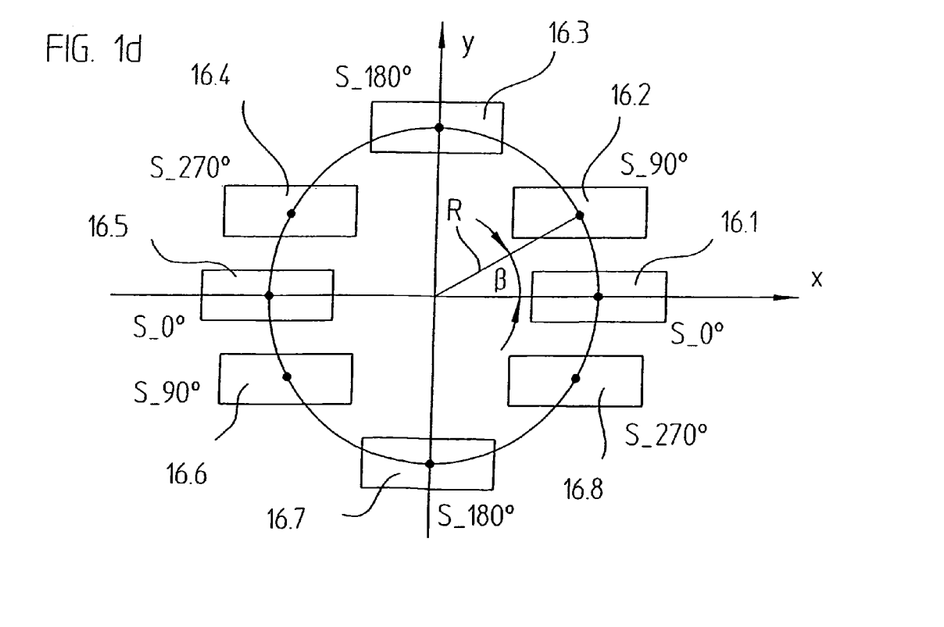
FIG. 1d is a partial plan view of the detection plane in the position measuring arrangement in accordance with FIGS. 1a and 1b.

A first embodiment of the position measuring arrangement in accordance with the present invention, in particular the scanning grating employed there, will be explained in what follows by FIGS. 1a to 1d. Here, FIGS. 1a and 1b show, each in a schematic view, partial scanning beam paths in a lateral plan view in the x, z-plane. The scanning beam path from the light source 11 up to the impingement of the partial beam bundles on the reflector elements 15.1, 15.2 is represented in FIG. 1a. FIG. 1b shows the scanning beam path from the impingement of the partial beam bundles on the reflector elements 15.1, 15.2 up to the detector elements 16.1 to 16.5. FIGS. 1c and 1d show partial plan views of the scanning grating 17 and of the detector plane of this exemplary embodiment.

In this example, the position measuring arrangement in accordance with the present invention includes a measurement grating 20, designed as a reflection measurement grating, as well as a scanning unit 10, which is movable with respect to it along at least one measuring direction x. The objects, whose relative position is to be determined with the aid of the position measuring arrangement, are coupled in a known manner with the reflection measurement grating 20 and the scanning unit 10. Here, these can perhaps be parts of a machine, whose relative position must be precisely detected. The incremental signals, or respectively positional data, generated by the position measuring arrangement in accordance with the present invention are further processed in a non-represented electronic follow-up device or evaluation device, for example for controlling the machine.

A position measuring arrangement for detecting linear movements, having a linearly extending measurement grating 20, is represented in the present exemplary embodiment; rotary position measuring arrangements can of course also be realized on the basis of the ideas in accordance with the present invention.

The scanning beam path of the first embodiment of the position measuring arrangement in accordance with the present invention will be described in what follows by FIGS. 1a and 1b.

In the represented example, the bundle of beams emitted by the light source 11, for example a laser light source, is initially collimated by an optical collimation device 12, i.e. converted into a parallel bundle of beams. The collimated bundle of beams thereafter passes, undeflected, through the support substrate 13.1 of the scanning plate 13. The support substrate 13.1 is embodied as a plan-parallel glass plate. Various optical elements are arranged on its top and underside, whose definite function in the scanning beam path will be addressed in detail in what follows.

After passing through the scanning plate 13, the collimated bundle of beams impinges for the first time on the measurement grating 20, namely on the measuring graduation 22 extending there along the measuring direction x. In the present case of a reflection measurement grating, the measuring graduation 22 includes an arrangement, periodic along the measuring direction x, of structural elements, or respectively partial areas 22.1, 22.2 of differing optical reflection properties. The line-shaped partial areas 22.1, 22.2 extend perpendicularly in relation to the measuring direction x in the indicated direction y (also called line direction in what follows) and are arranged on a support body 21 of the reflection measurement grating 20. In the represented example, the measuring graduation 22 is designed as an incident light phase grating, in which the structural elements, or respectively partial areas 22.1, 22.2 have a different phase-shifting effect on the bundles of beams impinging thereon. Moreover, a layout of the measuring graduation 22 is advantageous, in which the diffraction efficiency in the first order is maximized. In what follows, the graduation period of the measuring graduation will be identified as $TP_M$ and is defined as the length of two successive partial areas 22.1, 22.1 along the measuring direction x. In a possible embodiment, the graduation period $TP_M$ is selected within the range between $1.1*\lambda$ and $10*\lambda$, wherein $\lambda$ is the wavelength of the light source 11 used. Accordingly, in the case of a light source designed as a VCSEL (Vertical Cavity Surface-Emitting Laser) or LED, with $\lambda=850$ mm, the graduation period $TP_M$ could be $TP_M=2.048$ μm.

Following the first impingement on the measurement grating 20, a splitting of the incoming bundle of beams into two partial bundles of beams, which are reflected back to the scanning unit 10 and correspond to the +/− orders of diffraction, occurs at a first impingement location. The retro-reflected partial bundles of beams first pass through the gratings 14.1, 14.2, represented in FIG. 1a, on the underside of the scanning plate 13. In the present example, the gratings 14.1, 14.2 are designed as transmission gratings. The partial bundles of beams are deflected in a defined manner by the gratings 14.1, 14.2 and then reach the level reflector elements 15.1, 15.2 on the top of the scanning plate 13. The two gratings 14.1, 14.2 which are first passed have the same graduation period, which will be called $TP_{G1}$ in what follows. In the present, first exemplary embodiment, the graduation period $TP_{G1}$ of the gratings 14.1, 14.2 will be selected to be different from the graduation period $TP_M$ of the measuring graduation 22. Because of this selection of the graduation period $TP_{G1}$, the partial bundles of beams are not propagated perpendicularly in relation to the scanning plate 13 after passage through the gratings 14.1, 14.2.

As represented in FIG. 1b, a retro-reflection of the partial bundles of beams in the direction toward the measurement grating 20 takes place at the reflector elements 15.1, 15.2. Prior to impinging on the measurement grating 20 at the second impingement location, which differs from the first impingement location, the partial bundles of beams pass through the two further gratings 14.3, 14.4, which are also arranged on the underside of the scanning plate 13. A further deflection of the transmitted partial bundles of beams in the direction toward the respective second impingement location on the measurement grating 20 takes place via these gratings 14.3, 14.4. The two gratings 14.3, 14.4, through which passage has now occurred, have the same graduation period, which will be called $TP_{G2}$ in what follows.

As described in DE 10 2005 029 917.2 of Applicant, the gratings 14.1 to 14.4 have an optical double function. On the one hand, along the measuring direction x they act like a regular periodic deflection grating with the graduation periods $TP_{G1}$, or respectively $GP_{G2}$. On the other hand, along the line direction y in the measuring graduation plane they act like cylinder lenses, which focus the incoming bundles of beams on the reflector elements 15.1, 15.2 and thereafter collimate them again. In the represented example of FIGS. 1a and 1b, the gratings 14.1, 14.2 focus the bundles of beams, while the gratings 14.3, 14.4 collimate them again. As described in DE 10 2005 029 917.2 of Applicant, the combination of a reflector element and a lens represents a retro-reflector element for the line direction y of the measurement grating. Based on the offset in the y-direction between the bundles of beams and the optical axes of the cylinder lenses, an offset in the y-direction between the first and second impingement locations on the reflection measurement grating is simultaneous caused. So that the scanning gratings can take on all these optical functions at the same time, they must be embodied as gratings with curved grating lines, as described in the mentioned DE 10 2005 029 917.2 and represented schematically in the subsequent FIG. 1d; in what follows, diffractive deflection/lens elements will also be mentioned with respect to such grating structures.

Accordingly, in the represented first exemplary embodiment the component includes the scanning plate 13 with the support substrate 13.1, the gratings 14.1, 14.2, 14.3, 14.4, as well as the level reflector elements 15.1, 15.2 functions as a retro-reflector element on the part of the scanning unit 10. By these a retro-deflection of the partial bundles of beams coming from the measurement grating 20 in the direction toward the measurement grating 20 takes place in order to act on it a second time. Here, the retro-reflection takes place in the indicated y-direction.

In the represented first exemplary embodiment of FIGS. 1a to 1d, a renewed diffraction at the respective second impingement locations on the measurement grating 20 and retro-reflection of the impinging bundles of beams in the direction toward the scanning unit 10 results. The partial beam bundles used for signal generation thereafter impinge on a transmission-capable scanning grating 17, which functions as a combining grating in the scanning beam path and is arranged on the underside of the scanning plate 13.

In case of a relative displacement of the measurement grating 20 and scanning unit 10, a fringe pattern, which is modulated as a function of the displacement and has a fringe pattern periodicity $TP_S$, is created because of the interaction of the bundles of beams with the measurement grating and the different gratings in the scanning beam path in the scanning plane. In the present example, with a graduation period $TP_M=2.048$ μm of the measurement grating 20 and grating graduation periods $TP_{AG1}=2.194$ μm, $TP_{AG2}=1.861$ μm of the gratings 14.1 to 14.4, an approximate fringe pattern periodicity $TP_S=30$ μm results.

In connection with the position measuring arrangement in accordance with the present invention, the spatially periodic intensity distribution of the fringe pattern in the scanning plane is converted to different locations in the detection plane, for which purpose an additional optical focusing device 18 is also provided in the instant example. By the conversion of the spatially periodic intensity distribution of the fringe pattern in the scanning plane into a spatial direction-dependent intensity distribution, the same spatial propagation directions are assigned to locations in the fringe pattern with the same properties. In the case of the periodic fringe patterns in the scanning plane, which are shift-dependently modulated, this means that locations in the fringe pattern with identical phase relations should respectively be deflected identically by the scanning grating 17. In the detection plane which is located in an area in which the bundles of beams coming from the scanning grating 17 are completely spatially separated, a total of eight detector elements 16.1 to 16.5 (detector elements 16.6-16.8 are hidden behind detector elements 16.1-16.5 and thus are not shown in FIG. 1b) are arranged in the various spatial directions. The shift-dependent, phase-shifted incremental signals are detected by the detector elements 16.1 to 16.5, but not all detector elements are represented in FIG. 1b.

The optical focusing device 18 provided in this exemplary embodiment is in principle not required here, but allows focusing of partial beam bundles of the same propagation direction, starting at the scanning grating 17, to particularly small detector elements 16.1 to 16.5. In turn, this makes possible a compact embodiment of the scanning unit 10. Because of the small detector element surfaces, the detector elements furthermore have small capacitances, so that the signal noise is reduced. Moreover, because of the optical focusing device it is possible to select larger beam cross sections for scanning, without increasing the structural height of the scanning unit or the capacities of the detector elements. In turn, larger scanning surfaces result in principle in more stable incremental signals.

FIG. 1c shows a partial view of the scanning grating employed in connection with the example in accordance with FIGS. 1a and 1b, together with a portion of the fringe pattern S resulting in the scanning plane and having the fringe pattern periodicity $TP_S$. As mentioned above, the fringe pattern periodicity $TP_S=30$ μm in a possible exemplary embodiment.

The scanning grating 17, employed for converting the fringe pattern S into a spatial direction-dependent intensity distribution, includes a plurality of blocks, each with n=4 grating sections 17.1 to 17.4, exclusively arranged along the measuring direction x. Each one of the grating sections 17.1 to 17.4 is rectangularly embodied and in a linear direction extends in the mentioned y-direction, i.e. perpendicularly in relation to the measuring direction x. The scanning grating periodicity $TP_{AG}$ in which the blocks are arranged corresponds to the fringe pattern periodicity $TP_S$. In the instant example, n=4 differently embodied grating sections 17.1 to 17.4 are arranged along the measuring direction x, each of which creates a different spatial deflection effect on the bundles of beams being propagated through the respective grating sections 17.1 to 17.4; in this case the resulting spatial directions of the grating sections 17.1 to 17.4 differ within a block. The width $b_x$ of the various grating sections 17.1 to 17.4 along the measuring direction x is respectively $b_x=TP_S/4$, or respectively generally $b_x=TP_S/n$, with n>1, or respectively n=2, 3, 4.

Because of their respective design, the four differently embodied grating sections 17.1 to 17.4 create different spatial deflection effects on the bundles of beam impinging on them. To this end, each of the grating sections has periodic grating structures with periodically-arranged structural elements, which have different optical properties. Depending on whether the grating structures in the grating sections are embodied as amplitude gratings or as phase gratings, the different optical properties either have different phase-shifting effects or different transparencies. Thus, the structural elements of an amplitude grating can for instance have periodically arranged transparent and non-transparent partial areas.

The structural elements are periodically arranged within the respective grating sections, and the periodicity of the structural elements in the grating sections will be identified in what follows as grating section periodicity $TP_G$. In the example of FIG. 1c, all four different grating sections 17.1 to 17.4 have the same grating section periodicity $TP_G=1.875$ μm.

In the instant embodiment, the four different grating sections 17.1 to 17.4 within a block differ from each other with respect to the twist angle $\alpha_i$ (i=1 ... 4) at which the periodic structural elements are arranged with respect to an axis y extending perpendicularly in relation to the measuring direction x. In FIG. 1c, the twist angle $\alpha_2$ has been drawn in for the grating section 17.2, which here has been selected as $\alpha_2=30°$. As can be further seen in FIG. 1c, in this variation four different twist angles $\alpha_i$ (i=1 ... 4) have been provided for the four different grating sections 17.1 to 17.4, which have been selected in accordance with $\alpha_1=0°$, $\alpha_2=30°$, $\alpha_3=90°$, $\alpha_4=-30°$.

Based on the selection of these twist angles $\alpha_i$ (i=1 . . . 4), a defined spatial deflection of the parts of the fringe pattern S assigned to the respective grating sections 17.1 to 17.4 results, which can be derived from the known grating diffraction equation. In accordance with the invention, at least a deflection of the bundles of beams impinging on each grating section 17.1 to 17.4 in two spatial direction occurs, namely at least one deflection in the +1st and in the −1st order of diffraction. In the case of the present example, possible further orders of diffraction are not employed for obtaining signals.

Thus, in the representation of FIG. 1d, the deflection angles +/−β result in the detector plane for each grating section 17.1 to 17.4 in accordance with the following compilation:

| Incremental Signal | S_0° | S_90° | S_180° | S_270° |
|---|---|---|---|---|
| Twist Angle of the Structural Elements $\alpha_i[°]$ = i = 1 . . . 4 | 0 | 30 | 90 | −30 |
| Angle of the +1st order of Diffraction β [°] | 0 | 30 | 90 | 150 |
| Angle of the −1st order of Diffraction β [°] | 180 | 210 | 270 | 300 |

Accordingly, the incremental signal S_0° is generated from the grating sections 17.1 of the scanning grating 17, the incremental signal S_90° from the grating sections 17.2, the incremental signal S_180° from the grating sections 17.3 and the incremental signal S_270° from the grating sections 17.4. The instant first exemplary embodiment therefore represents a four-phase system, whose four phase-shifted incremental signals S_0°, S_90°, S_180°, S_270° can be evaluated in a known manner.

Eight detector elements 16.1 to 16.8 are arranged in the detector plane in the different spatial directions, in which a corresponding deflection effect in the +/−1st orders of diffraction results from the grating sections 17.1 to 17.4, such as is represented in FIG. 1d.

It is now possible to detect four shift-dependent, phase-shifted incremental signals S_0°, S_90°, S_180° and S_270° by the eight detector elements 16.1 to 16.8. In FIG. 1d it is shown for each one of the eight detector elements 16.1 to 16.8 which of the different four incremental signals S_0°, S_90°, S_180° and S_270° is detected by them.

As can furthermore be seen from FIG. 1d, in this exemplary embodiment the centers of area of the detector elements 16.1 to 16.8 lie on a circle with the radius R; in a possible embodiment, R=2 mm is selected. It can also be seen in FIG. 1d that in this case the detector elements 16.1 to 16.8 are designed to be rectangular and have a greater length along the measuring direction x than along the direction y, which extends perpendicular to it. Because of this design of the detector element geometry it is possible to guarantee particularly large tolerances with respect to pitch movements of the scanning unit in relation to the measurement grating.

The described first exemplary embodiment of a suitable scanning grating assures an optimal use of the space in the detector plane and reduces the required structural space in the scanning unit. Further embodiments of scanning gratings for the position measuring arrangement in accordance with the present invention, which are optimized with respect to other requirements, will be explained in what follows.

A second variant of a suitable scanning grating 170 for a position measuring arrangement in accordance with the present invention, as well as the arrangement of the detector elements in the detector plane, will be explained by FIGS. 2a and 2b. Again, such a scanning grating could for example be employed in a position measuring arrangement such as had been explained by the scanning beam path in FIGS. 1a and 1b. The second exemplary embodiment described below again represents a four-phase system, from which four phase-shifted incremental signals S_0°, S_90°, S_180° and S_270°, modulated as a function of the shift and with respective phase offsets of 90°, result. As in the previous example, the value n is therefore again selected as n=4.

As above, n=4 grating sections 170.1 to 170.4 are provided in the scanning grating 170, which are arranged along the measuring direction x in blocks with the fringe pattern period $TP_S$. The width $b_x$ of a grating section 170.1 to 170.4 within a block is again selected to be $b_x=TP_S/4$.

In contrast to the previous variant, the scanning grating 170, or respectively the different grating sections 170.1 to 170.4 now include two different grating section periodicities $TP_{G1}$, $TP_{G2}$, wherein $TP_{G1}=2*TP_{G2}$ is definitely selected. Thus, the grating sections 170.1 and 170.3 have the larger grating section periodicity $TP_{G1}$, the grating sections 170.2 and 170.4 the smaller grating section periodicity $TP_{G2}$. Furthermore, the twist angles $\alpha_i$ (i=1 . . . 4) of the four different grating sections 170.1 to 170.4 have been selected to be different from the explained first embodiment, as can be seen in FIG. 2a; thus, in this variant only two different twist angles $\alpha_i$ are provided, namely the twist angles $\alpha_1=0°$, $\alpha_2=0°$, $\alpha_3=90°$, $\alpha_4=90°$.

Figure 2A:
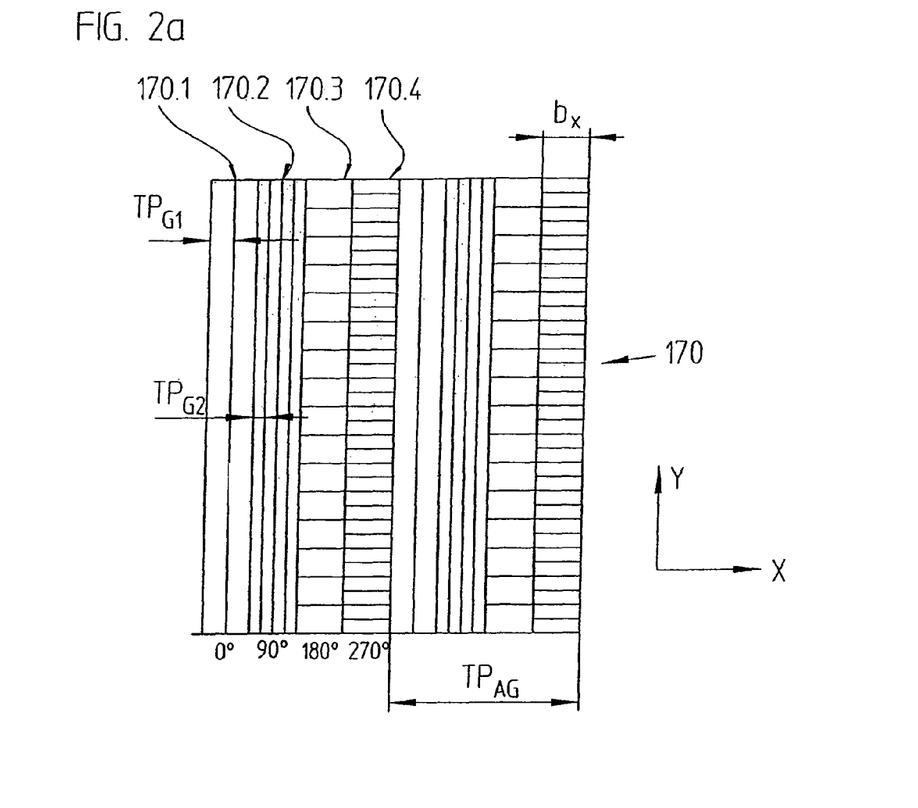
Figure 2B:
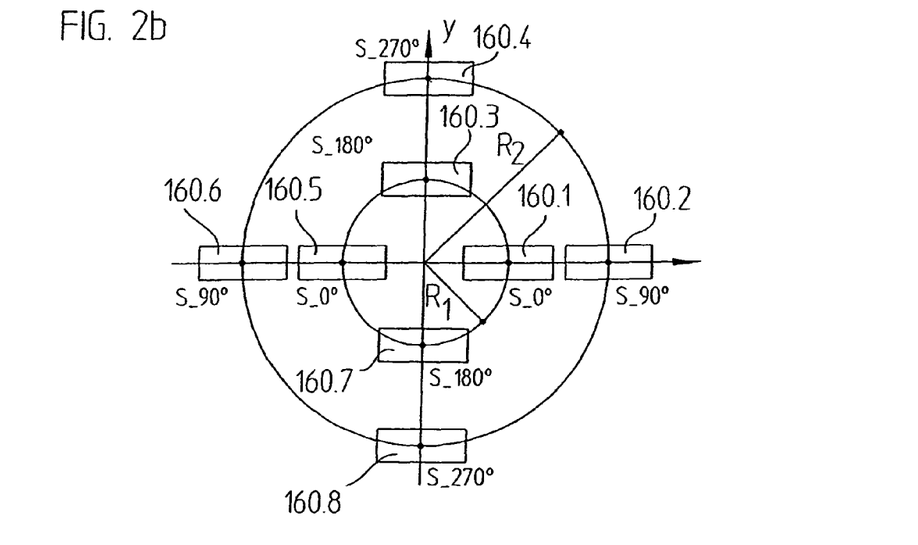

In accordance with the representation in FIG. 2b, the deflection angles +/−β for each grating section 170.1 to 170.4 now result in the detection plane in accordance with the following compilation:

| Incremental Signal | S 0° | S_90° | S_180° | S_270° |
|---|---|---|---|---|
| Twist Angle of the Structural Elements $\alpha_i[°]$ = i = 1 . . . 4 | 0 | 0 | 90 | 90 |
| Angle of the +1st order Diffraction β [°] | 0 | 0 | 90 | 90 |
| Angle of the −1st order of Diffraction β [°] | 180 | 180 | 270 | 270 |
| Radius of the Detector Element Foci [R] | 1 | 2 | 1 | 2 |

As can be seen from the compilation, as well as from FIG. 2b, the—again rectangular-shaped—detector elements are now arranged with their centers of area on two circles with the radii R1 and R2, wherein R2=2*R1. Here, the arrangement of the foci of the detector elements 160.1, 160.3, 160.5 and 160.7 is on the circle with the radius R1, the foci of the detector elements 160.2, 160.4, 160.6 and 160.8 are arranged in the manner shown on the circle with the radius R2.

In the case of this exemplary embodiment, as can be seen in FIG. 2a, the structured elements of the scanning grating 170 are all aligned parallel in the position measuring arrangement, or perpendicularly in relation to the other gratings, in particular in relation to the measurement grating, whose structured elements also extend in the y-direction and are arranged periodically along the measuring direction x. A design of the scanning grating 170 has been shown to be advantageous in which a so-called VCSEL (vertical cavity surface-emitting laser) light source is employed. Since so-called polarization jumps sometimes occur in such light sources, these are preferably arranged in such a way that the main polarization axes of the VCSEL light source assume the angles +/−45° in relation to the structural elements of the measurement graduation on the measurement grating. The connection with the second embodiment of the scanning plate 170 is assured in that incremental signals, which are phase-shifted by 180°, result from the grating sections 170.1 to 170.4 of the scanning plate 170, which have the same grating section periodicity $TP_{G1}$ or $TP_{G2}$, so that therefore identical efficiency conditions in regard to these incremental signals exist.

Otherwise, regarding this embodiment of a scanning grating, as well as the arrangement of the detector elements in the detector plane, reference is made to the above explanations regarding the first variant of a suitable scanning grating.

Figure 3A:
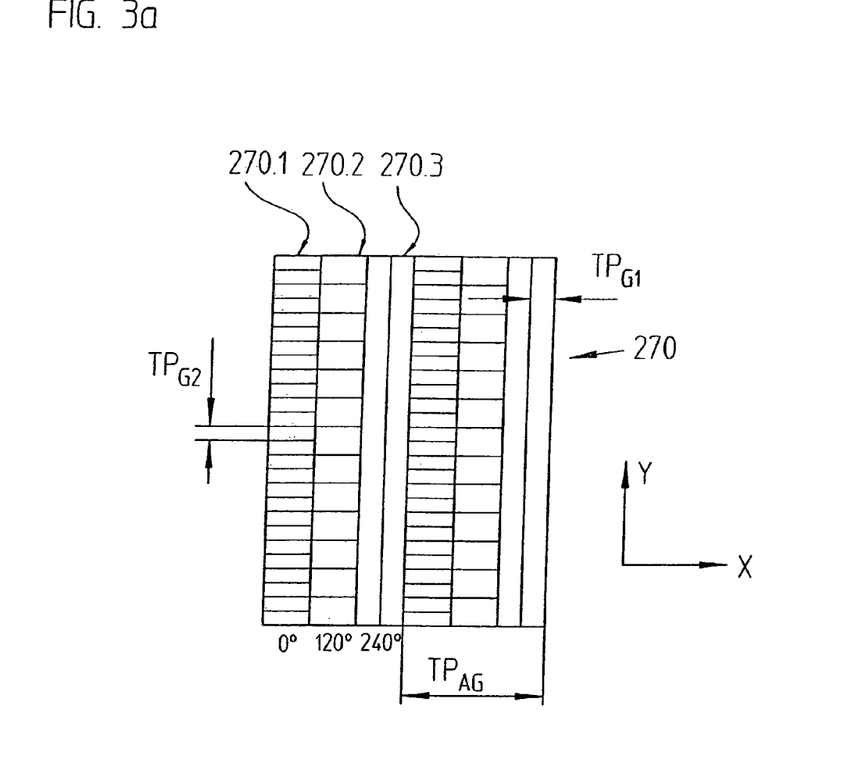

A third embodiment of a scanning grating 270 will be explained in what follows by FIGS. 3a and 3b, which again represent partial plan views of the scanning grating 270, as well as of the detector plane with detector elements 260.1 to 260.6 placed there. Such a scanning grating 270 could also be employed for example in a position measuring arrangement such as has been explained by the scanning beam path in FIGS. 1a and 1b. In contrast to the two variants described above, the third exemplary embodiment of a scanning grating 270 is suitable for a three-grating system, in which three phase-shifted incremental signals S_0°, S_120° and S_240° are generated in the position measuring arrangement in accordance with the present invention; the above mentioned value n has now been selected to be n=3.

In this embodiment, the scanning grating 270 includes three different grating sections 270.1 to 270.3, which are arranged in blocks with the fringe pattern period $TP_S$ along the measuring direction x, wherein the width $b_x$ of a grating section 270.1 to 270.3 is respectively selected as $b_x=TP_S/3$. Two different grating section periodicities $TP_{G1}$, $TP_{G2}$ are again provided, wherein $TP_{G1}=2*TP_{G2}$. The grating sections 270.2 and 270.3 have the larger grating section periodicity $TP_{G1}$, the grating section 270.1 the smaller grating section periodicity $TP_{G2}$. As can be seen in FIG. 2a, regarding the orientation of the structural elements in the grating sections 270.1 to 270.3, two different twist angles $\alpha_i$ (i=1 ... 3) have been selected for the three different grating sections 270.1 to 270.3, namely the twist angles $\alpha_1=90°$, $\alpha_2=90°$, $\alpha_3=0°$.

Figure 3B:
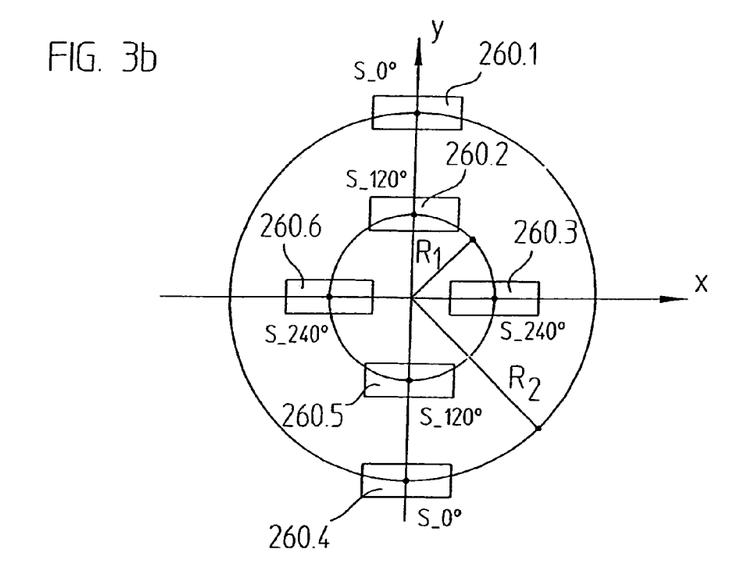

In accordance with the representation in FIG. 3b, the deflection angles $+/-\beta$ for each grating section 270.1 to 270.3 now result in the detection plane in accordance with the following compilation:

| Incremental Signal | S_0° | S_120° | S_240° |
|---|---|---|---|
| Twist Angle of the Structural Elements $\alpha_i[°] = i = 1 \ldots 3$ | 90 | 90 | 0 |
| Angle of the +1st order of Diffraction $\beta$ [°] | 90 | 90 | 0 |
| Angle of the −1st order of Diffraction $\beta$ [°] | 270 | 270 | 180 |
| Radius of the Detector Element Foci [R] | 2 | 1 | 1 |

As can again be seen by the compilation, as well as from FIG. 3b, the centers of area of the six detector elements 260.1 to 260.6 are again arranged on two circles with the radii R1 and R2, with R2=2*R1. In this case the arrangement of the centers of area of the detector elements 260.2, 260.3, 260.5 and 260.6 is on the circle with the radius R1, the foci of the detector elements 260.1, 260.4 are arranged in the manner shown on the circle with the radius R2.

Regarding the special advantages of this variant in connection with a three-phase system, reference is made to the above explanations regarding the polarization problems in connection with VCSEL light sources.

Figure 4A:
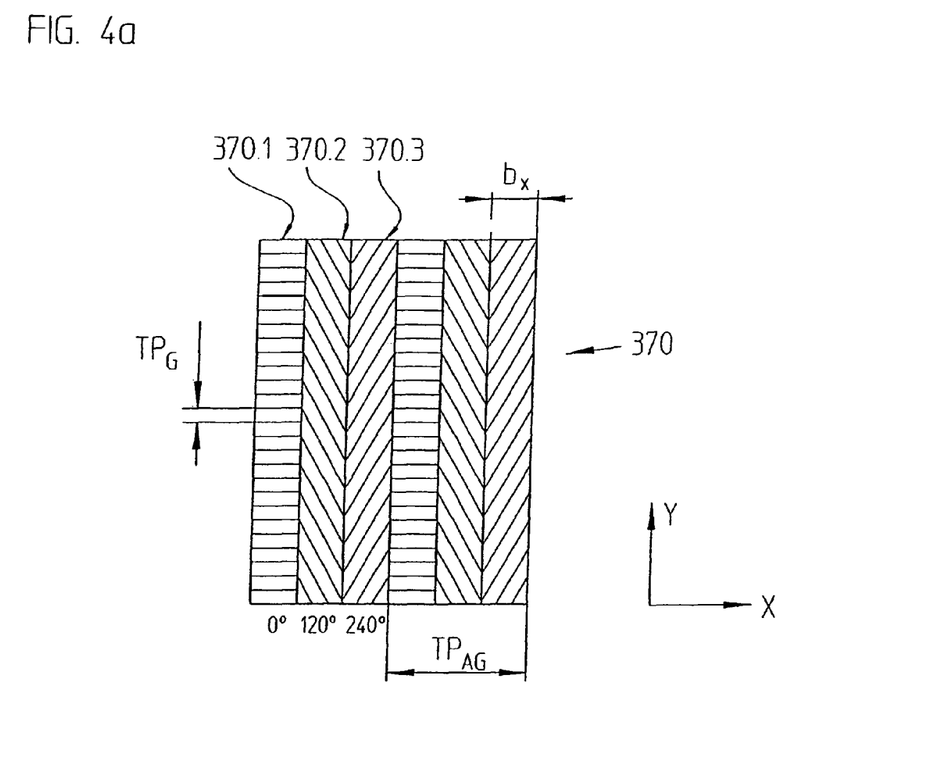
Figure 4B:
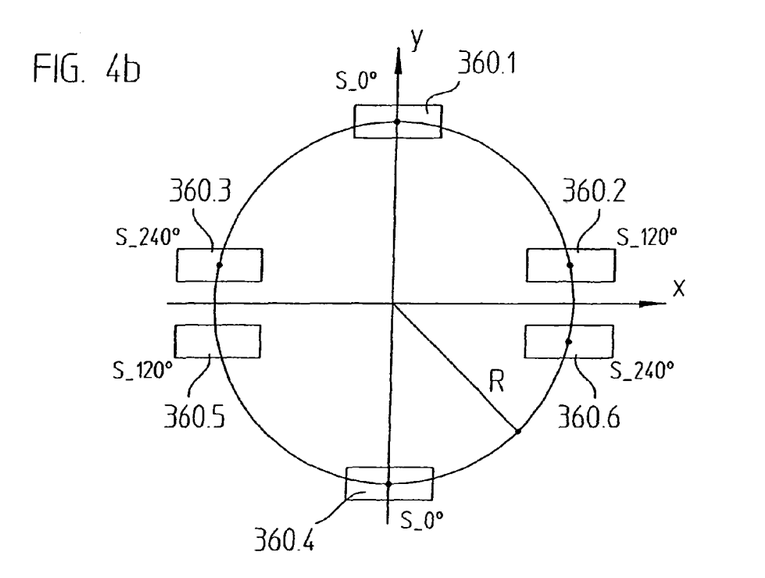

Finally, reference is made to a fourth embodiment of a suitable scanning grating 370, which could also be employed in a position measuring arrangement, by means of FIGS. 4a and 4b; this variant of a scanning grating 370 is again suited for a three-phase system (n=3).

As in the previous example, the scanning grating 370 includes three different grating sections 370.1 to 370.3, which are arranged in blocks with the fringe pattern period $TP_S$ along the measuring direction x, wherein the width $b_x$ of a grating section 370.1 to 370.3 is again respectively selected as $b_x=TP_S/3$. In contrast with the previous variant it is provided that in all three different grating sections the same grating section periodicity $TP_G$ is selected for the structural elements.

Regarding the orientation of the structural elements in the grating sections 370.1 to 370.3, three different twist angles $\alpha_i$ (i=1 ... 3) have been selected for the three different grating sections 370.1 to 370.3, namely $\alpha_1=90°$, $\alpha_2=20°$, $\alpha_3=-20°$, as can be seen in FIG. 4a.

In accordance with the representation in FIG. 4b, the deflection angles $+/-\beta$ for each grating section 370.1 to 370.3 now result in the detection plane in accordance with the following compilation:

| Incremental Signal | S_0° | S_120° | S_240° |
|---|---|---|---|
| Twist Angle of the Structural Elements $\alpha_i[°] = i = 1 \ldots 3$ | 90 | 20 | −20 |
| Angle of the +1st order of Diffraction $\beta$ [°] | 90 | 20 | −20 |
| Angle of the −1st order of Diffraction $\beta$ [°] | 270 | 200 | 160 |
| Radius of the Detector Element Foci [R] | 1 | 1 | 1 |

It should be stated that it is advantageous in connection with this variation of a scanning grating 370 for a position measuring arrangement in accordance with the present invention that, because of the resultant angles $\beta$ for the deflection of the +1st and −1st orders of diffraction, the space in the detector plane available for the six detector elements 360.1 to 360.6 is optimally used. A compact system with a relatively small structural volume results for the scanning unit.

Besides the explained exemplary embodiments, there are of course still other alternative design options within the framework of the present invention.

It should therefore be pointed out that the scanning beam path for generating a periodic fringe pattern in a scanning plane explained by FIGS. 1a and 1b is not necessarily compelling for the present invention. Such a fringe pattern can also be generated by measurement gratings which are differently embodied, and/or scanning units via the interaction of the bundles of beam emitted by a light source with the measurement grating and further optional gratings in the scanning beam path. Basically, alternatively to the explained incident light system, a transmitted light system with a transmitted light measurement grating could of course also be realized in accordance with the present invention. In the same way it is possible, besides a position measuring arrangement for detecting linear movements, to design a rotary position measuring arrangement in accordance with the present invention.

It is moreover also possible to employ, in place of the described transmitting scanning gratings, reflective variations thereof and to provide an oblique illumination for them in the line direction y. In this case a further beam deflection by appropriate reflector elements and further steps would then be necessary in addition.

The foregoing description is provided to illustrate the present invention, and is not to be construed as a limitation. Numerous additions, substitutions and other changes can be made to the present invention without departing from its scope as set forth in the appended claims.

We claim:

1. An optical position measuring arrangement for the generation of n>1 phase-shifted incremental signals characterizing relative positions of two objects which are movable with respect to each other along a measuring direction, the optical position measuring arrangement comprising:
   a light source that emits bundles of beams;
   a measurement grating;
   a plurality of optional gratings; and
   a scanning unit comprising:
      a scanning grating arranged in a scanning plane, wherein said scanning grating comprises a plurality of blocks arranged periodically along said measuring direction with a scanning grating periodicity $TP_{AG}$ equaling a fringe pattern periodicity $TP_S$, and each block comprises n grating sections (n=1, 2, 3, . . . ) of a width $b_x = TP_{AG}/n$, exclusively arranged along said measuring direction, and each of said n grating sections comprises a periodic grating structure, which causes a deflection of said bundles of beams propagated through each of said n grating sections in several spatial directions, in which resulting spatial directions of said n grating sections in a block differ; and
      a plurality of detector elements arranged downstream of said scanning grating, wherein said detector elements are arranged in said spatial directions in said detector plane, and wherein said detector plane is located in an area in which said bundles of beams coming from said scanning grating are completely spatially separated; and
   wherein said fringe pattern having a periodicity $TP_S$ is formed in said scanning plane by an interaction of said bundles of beams emitted by said light source with said measurement grating and said further optional gratings.

2. The optical position measuring arrangement in accordance with claim 1, wherein said grating structures of each grating section comprises structural elements which are periodically arranged at a grating section periodicity $TP_G$, alternatingly have different optical properties, and are respectively arranged within a grating section at an identical twist angle ($\alpha_i$, i=1, 2 and 3 or 1, 2, 3 and 4) with respect to an axis extending perpendicularly in relation to said measuring direction.

3. The optical position measuring arrangement in accordance with claim 2, wherein for n=4 different grating sections in a block, two or four different twist angles ($\alpha_i$) are selected for said structural elements of each of said grating sections.

4. The optical position measuring arrangement in accordance with claim 3, wherein when two different twist angles ($\alpha_i$) are selected then $\alpha_1=0°$, $\alpha_2=0°$, $\alpha_3=90°$ and $\alpha_4=90°$.

5. The optical position measuring arrangement in accordance with claim 3, wherein when four different twist angles ($\alpha_i$) are selected then $\alpha_1=0°$, $\alpha_2=30°$, $\alpha_3=90°$ and $\alpha_4=-30°$.

6. The optical position measuring arrangement in accordance with claim 2, wherein for n=3 different grating sections in a block, two or three different twist angles ($\alpha_i$) are selected for said structural elements of each of said grating sections.

7. The optical position measuring arrangement in accordance with claim 6, wherein when two different twist angles ($\alpha_i$) are selected then $\alpha_1=90°$, $\alpha_2=90°$ and $\alpha_3=0°$.

8. The optical position measuring arrangement in accordance with claim 6, wherein when three different twist angles ($\alpha_i$) are selected then $\alpha_1=90°$, $\alpha_2=20°$ and $\alpha_3=-20°$.

9. The optical position measuring arrangement in accordance with claim 1, wherein said grating structures of each grating section comprises phase gratings, in which different structural elements respectively exert a different phase-shifting effect on said bundles of beams that impinge on said scanning grating.

10. The optical position measuring arrangement in accordance with claim 1, wherein said grating structures of each grating section comprises amplitude gratings, in which different structural elements respectively have a different transparency regarding said bundles of beams that impinge on said scanning grating.

11. The optical position measuring arrangement in accordance with claim 1, wherein n=3 or 4.

12. The optical position measuring arrangement in accordance with claim 1, wherein each of said plurality of detector elements are rectangular in shape and have a greater length along said measuring direction than along a direction which extends perpendicularly to said measuring direction.

13. The optical position measuring arrangement in accordance with claim 2, wherein said grating structures of each grating section have an identical grating section periodicity.

14. The optical position measuring arrangement in accordance with claim 13, wherein centers of area of each of said plurality of detector elements are arranged in said detector plane on a circle with a radius R.

15. The optical position measuring arrangement in accordance with claim 2, wherein said grating sections have two differing grating section periodicities.

16. The optical position measuring arrangement in accordance with claim 15, wherein centers of area of said plurality of detector elements are arranged in said detector plane on two circles with different radii.

17. The optical position measuring arrangement in accordance with claim 1, wherein said scanning unit is designed in such a way that said bundles of beams emitted by said light source impinge a first time on said measurement grating, where a split into two partial bundles of beams takes place, which are retro-reflected to said scanning unit and correspond to two different orders of diffraction, and
   wherein said two retro-reflected partial bundles of beams undergo a retro-reflection in said scanning unit in a direction toward said measurement grating by a retro-reflector element, and said partial bundles of beams respectively pass twice through gratings, and
   wherein said partial bundles of beams impinging on said measurement grating undergo a renewed diffraction and retro-reflection in a direction toward said scanning unit, and
   wherein in said scanning unit at least one pair of retro-reflected partial bundles of beams impinges on said scanning grating at a same location at symmetrical angles in relation to an optical axis.

18. The optical position measuring arrangement in accordance with claim 1, further comprising an optical focusing device arranged between said scanning grating and said detector elements, by which focusing of said partial bundles of beams, which have been deflected into said different spatial directions, on said detector elements takes place.

* * * * *